US010665202B2

(12) United States Patent
Ota (10) Patent No.: US 10,665,202 B2
(45) Date of Patent: May 26, 2020

(54) METHOD OF CONTROLLING IMAGE DISPLAY DEVICE, IMAGE DISPLAY SYSTEM, AND IMAGE DISPLAY DEVICE

(71) Applicant: SEIKO EPSON CORPORATION, Tokyo (JP)

(72) Inventor: Akihiko Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/232,286

(22) Filed: Dec. 26, 2018

(65) Prior Publication Data

US 2019/0197983 A1    Jun. 27, 2019

(30) Foreign Application Priority Data

Dec. 27, 2017    (JP) .................................. 2017-250713

(51) Int. Cl.
  *G09G 5/00* (2006.01)
  *G06F 3/147* (2006.01)
  *G06F 3/14* (2006.01)

(52) U.S. Cl.
  CPC ............... *G09G 5/003* (2013.01); *G06F 3/14* (2013.01); *G06F 3/147* (2013.01); *G06F 3/1423* (2013.01); *G09G 2330/021* (2013.01); *G09G 2354/00* (2013.01); *G09G 2370/06* (2013.01); *G09G 2370/16* (2013.01)

(58) Field of Classification Search
  CPC .......... G06F 3/14; G06F 3/1423; G06F 3/147; G09G 2330/021; G09G 2354/00; G09G 2370/06; G09G 2370/16; G09G 5/003

USPC ......................................................... 375/259
See application file for complete search history.

(56) References Cited

U.S. PATENT DOCUMENTS

| 9,210,290 | B2 * | 12/2015 | Koike ................ H04N 1/32122 |
| 9,311,490 | B2 * | 4/2016 | Martens .................. G06F 21/60 |
| 2006/0250374 | A1 * | 11/2006 | Morita .................. G06F 3/0488 345/173 |
| 2008/0200192 | A1 * | 8/2008 | Harris ..................... H04L 12/66 455/466 |

(Continued)

FOREIGN PATENT DOCUMENTS

JP    2013-164833 A    8/2013

*Primary Examiner* — Tony O Davis
(74) *Attorney, Agent, or Firm* — Oliff PLC (57) ABSTRACT

A method of controlling an image display device includes: transmitting a communication section setting command from a computer to a projector using wired or wireless communication is established, determining whether the projector communicates with the computer using the wired or the wireless communication in the case in which the projector receives the communication section setting command, updating communication section setting information so that the projector is set to a first operation state in which only the wired communication is enabled in a standby state in the case in which it is determined that the communication is performed using the wired communication, and updating the communication section setting information so that the projector is set to a second operation state in which only the wireless communication is enabled in the standby state in the case in which it is determined that the communication is performed using the wireless communication.

13 Claims, 5 Drawing Sheets

(56) References Cited

U.S. PATENT DOCUMENTS

| | | | |
|---|---|---|---|
| 2008/0309752 A1* | 12/2008 | Lam | H04N 7/15 348/14.08 |
| 2009/0149159 A1* | 6/2009 | Han | H04Q 3/0025 455/414.1 |
| 2009/0190502 A1* | 7/2009 | Mameda | H04W 76/18 370/255 |
| 2009/0305730 A1* | 12/2009 | Herz | H04L 51/38 455/466 |
| 2010/0093381 A1* | 4/2010 | Maguire | G06Q 10/107 455/466 |
| 2010/0161738 A1* | 6/2010 | Pascal | H04L 51/36 709/206 |
| 2011/0207405 A1* | 8/2011 | Minemura | H04B 5/0031 455/41.2 |
| 2012/0151374 A1* | 6/2012 | Liu | G06F 1/3209 715/740 |
| 2013/0013127 A1* | 1/2013 | Weinberg | H04L 12/417 701/1 |
| 2013/0179491 A1* | 7/2013 | Bennett | H04L 65/1076 709/203 |
| 2013/0179700 A1 | 7/2013 | Toda et al. | |
| 2014/0328357 A1* | 11/2014 | Fredriksson | H04J 3/0614 370/520 |
| 2015/0022724 A1* | 1/2015 | Chao | H04N 5/4403 348/734 |
| 2015/0046834 A1* | 2/2015 | Wu | H04L 51/04 715/748 |
| 2016/0149960 A1* | 5/2016 | Kato | H04N 7/148 348/14.12 |
| 2016/0179152 A1 | 6/2016 | Toda et al. | |
| 2017/0094107 A1* | 3/2017 | Kadota | H04N 1/00079 |
| 2018/0048847 A1* | 2/2018 | Tomita | G03B 21/14 |
| 2018/0120918 A1* | 5/2018 | Kwon | G06F 1/3253 |
| 2018/0262597 A1* | 9/2018 | Matthieu | H04L 69/18 |
| 2019/0196761 A1* | 6/2019 | Minakawa | G06F 3/1236 |

* cited by examiner

METHOD OF CONTROLLING IMAGE DISPLAY DEVICE, IMAGE DISPLAY SYSTEM, AND IMAGE DISPLAY DEVICE

CROSS-REFERENCE

The entire disclosure of Japanese Patent Application No. 2017-250713, filed Dec. 27, 2017 is expressly incorporated by reference herein.

BACKGROUND

1. Technical Field

The present invention relates to a method of controlling an image display device, an image display system, and an image display device.

2. Related Art

There is known an image display device capable of communicating with an external device using wired communication and wireless communication (see, e.g., JP-A-2013-164833 (Document 1)). The image display device (a projector device) described in Document 1 is arranged to be able to enable a communication function in a standby state so as to be able to communicate with the external device even in the standby state in which the power consumption should be reduced, and at the same time, arranged to be able to enable either one or both of communication methods of the wired communication and the wireless communication in accordance with the setting by the user. Here, in the case in which reduction of the power consumption in the standby state is attempted, there is made the setting for enabling either one of the communication methods.

However, if there is made the setting of enabling either one of the communication methods and disabling the other of the communication methods, there is a problem that it becomes impossible to perform communication between the external device and the image display device in the standby state in the case in which the communication between the external device and the image display device has been achieved by the communication method thus disabled.

SUMMARY

An advantage of some aspects of the invention is to solve at least a part of the problems described above, and the invention can be implemented as the following forms or application examples.

Application Example 1

A method of controlling an image display device according to an application example includes: establishing connection with one of a first communication method and a second communication method between a control device adapted to control the image display device and the image display device, transmitting a predetermined command from the control device to the image display device after the connection is established, determining whether the image display device communicates with the control device using the first communication method or the second communication method in a case of receiving the predetermined command, updating setting information so that the image display device is set to a first operation state in which communication using the first communication method is enabled and communication using the second communication method is disabled in a standby state in a case in which it is determined that the image display device communicates with the control device using the first communication method, and updating the setting information so that the image display device is set to a second operation state in which the communication using the second communication method is enabled and the communication using the first communication method is disabled in the standby state in a case in which it is determined that the image display device communicates with the control device using the second communication method.

According to the method of controlling an image display device, when the image display device receives the predetermined command from the control device, the image display device determines which communication method out of the first communication method and the second communication method is used in the communication with the control device having transmitted the command, and then sets the communication method enabled in the standby state to the one communication method based on the determination result. Therefore, the power consumption in the standby state is reduced compared to the case of keeping the both communication methods enabled, and at the same time, it is possible to prevent the communication between the control device and the image display device from becoming unachievable in the standby state.

Application Example 2

In the method of controlling an image display device according to the application example described above, it is desirable that the control device transmits the predetermined command in a case in which the connection with the image display device is established.

According to the method of controlling an image display device, since the control device transmits the predetermined command in the case in which the connection with the image display device has been established, it becomes possible to keep the communication with the control device thus connected also in the standby state.

Application Example 3

In the method of controlling an image display device according to the application example described above, it is desirable that the control device transmits the predetermined command in a case of making an instruction of initializing a setting value of the image display device.

According to the method of controlling an image display device, since the control device transmits the predetermined command in the case of making the instruction of initializing the setting value of the image display device, even if the communication method enabled in the standby state is restored to the initial setting value due to the initialization of the setting value, it becomes possible to update the setting information to the communication method with which the communication with the control device can be achieved.

Application Example 4

In the method of controlling an image display device according to the application example described above, it is desirable that the control device transmits the predetermined command in a case of making an instruction of making the image display device make the transition to the standby state.

According to the method of controlling an image display device, since the control device transmits the predetermined command in the case of making the instruction of making the image display device make the transition to the standby state, it is possible to prevent that it becomes unachievable for the same control device to make the instruction of being restored from the standby state after making the image display device make the transition to the standby state.

Application Example 5

In the method of controlling an image display device according to the application example described above, it is desirable that a first IP address used in a case of performing the communication using the first communication method and a second IP address used in a case of performing the communication using the second communication method are set to the image display device, and the image display device obtains an IP address designated by the control device as a destination of the predetermined command, and then compares the IP address obtained with the first IP address and the second IP address to determine the communication method.

According to the method of controlling an image display device, since the communication method is determined based on the IP address designated by the control device as the destination of the predetermined command, it becomes possible to easily determine the communication method using the comparison with the IP addresses set to the image display device.

Application Example 6

In the method of controlling an image display device according to the application example described above, it is possible that a first IP address used in a case of performing the communication using the first communication method and a second IP address used in a case of performing the communication using the second communication method are set to the image display device, and the image display device obtains an IP address of the control device, and then compares a subnet of the IP address obtained with subnets of the first IP address and the second IP address to determine the communication method.

According to the method of controlling an image display device, since the communication method is determined based on the subnet of the IP address of the control device having transmitted the predetermined command, it becomes possible to easily determine the communication method using the comparison with the subnet of the IP addresses set to the image display device.

Application Example 7

In the method of controlling an image display device according to the application example described above, it is possible that the first communication method is a communication method adapted to perform the communication with wire, and the second communication method is a communication method adapted to perform the communication wirelessly.

Application Example 8

In the method of controlling an image display device according to the application example described above, it is possible that the first communication method and the second communication method are each a communication method of performing the communication wirelessly.

Application Example 9

An image display system according to an application example is an image display system including an image display device adapted to display an image, and a control device adapted to control the image display device, wherein the control device includes a first communication section adapted to establish connection using one of a first communication method and a second communication method with the image display device, and then transmit a predetermined command to the image display device after the connection is established, the image display device includes a second communication section capable of performing communication with the control device using the first communication method and the second communication method, a determination section adapted to determine whether the second communication section communicates with the control device using the first communication method or the second communication method in a case in which the second communication section receives the predetermined command from the control device, and a control section adapted to update setting information used to set an operation state of the second communication section in a standby state based on a determination result of the determination section, and the control section updates the setting information so that the second communication section is set to a first operation state in which communication using the first communication method is enabled and communication using the second communication method is disabled in the standby state in a case in which the determination section determines that the communication with the control device is performed using the first communication method, and updates the setting information so that the second communication section is set to a second operation state in which the communication using the second communication method is enabled and the communication using the first communication method is disabled in the standby state in a case in which the determination section determines that the communication with the control device is performed using the second communication method.

According to the image display system, when the image display device receives the predetermined command from the control device, the image display device determines which communication method out of the first communication method and the second communication method is used in the communication with the control device having transmitted the command, and then sets the communication method enabled in the standby state to the one communication method based on the determination result. Therefore, the power consumption in the standby state is reduced compared to the case of keeping the both communication methods enabled, and at the same time, it is possible to prevent the communication between the control device and the image display device from becoming unachievable in the standby state.

Application Example 10

An image display device according to an application example is an image display device adapted to display an image and including a communication section capable of performing communication with an external control device using a first communication method and a second communication method, a determination section adapted to determine whether the communication section communicates with the control device using the first communication method or the second communication method in a case in which the communication section receives a predetermined command from the control device, and a control section adapted to update setting information used to set an operation state of the communication section in a standby state based on a determination result of the determination section, wherein the control section updates the setting information so that the communication section is set to a first operation state in which communication using the first communication method is enabled and communication using the second communication method is disabled in the standby state in a case in which the determination section determines that the communication with the control device is performed using the first communication method, and updates the setting information so that the communication section is set to a second operation state in which the communication using the second communication method is enabled and the communication using the first communication method is disabled in the standby state in a case in which the determination section determines that the communication with the control device is performed using the second communication method.

According to the image display device, when receiving the predetermined command from the control device, the image display device determines which communication method out of the first communication method and the second communication method is used in the communication with the control device having transmitted the command, and then sets the communication method enabled in the standby state to the one communication method based on the determination result. Therefore, the power consumption in the standby state is reduced compared to the case of keeping the both communication methods enabled, and at the same time, it is possible to prevent the communication between the control device and the image display device from becoming unachievable in the standby state.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

An image display system 100 according to the present embodiment will hereinafter be described with reference to the drawings.

Figure 1:
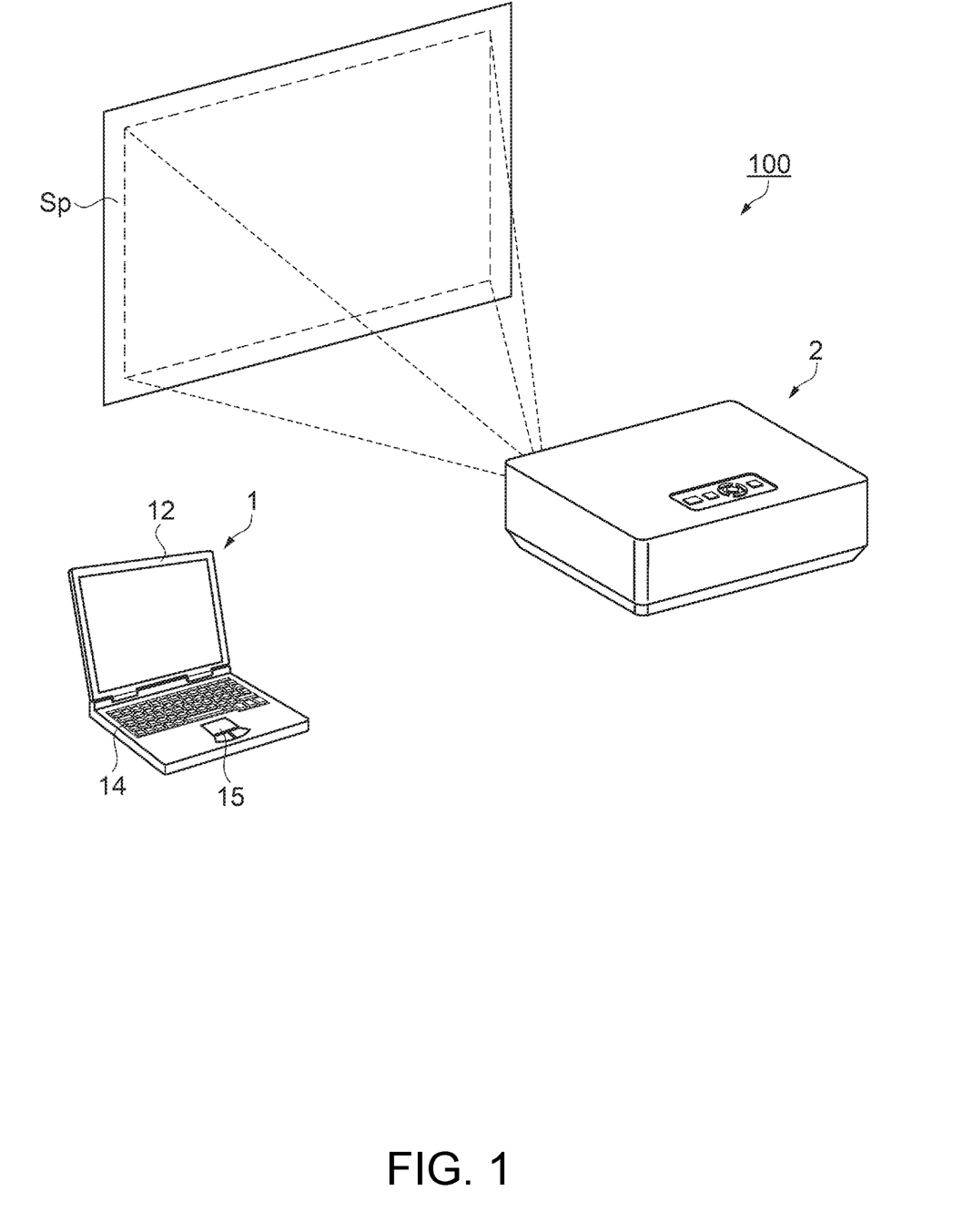
FIG. 1 is an explanatory diagram showing an image display system.

FIG. 1 is an explanatory diagram showing the image display system 100 according to the present embodiment.

As shown in FIG. 1, the image display system 100 is provided with at least one computer 1 as a control device, and at least one projector 2 as an image display device. The computer 1 is, for example, a notebook type personal computer, and is configured integrally including a display section 12 for displaying an image, a keyboard 14 as an input device, a touch pad 15 as a pointing device, and so on. The image (hereinafter also referred to as an "input image") based on image information input from the outside or image information previously stored inside is projected by the projector 2 on a projection surface Sp such as a screen or a wall surface. Further, the projector 2 is made capable of performing communication using wired connection or wireless connection with the computer 1, and is capable of receiving a control command from the computer 1 to perform an operation corresponding to the control command thus received.

Figure 2:
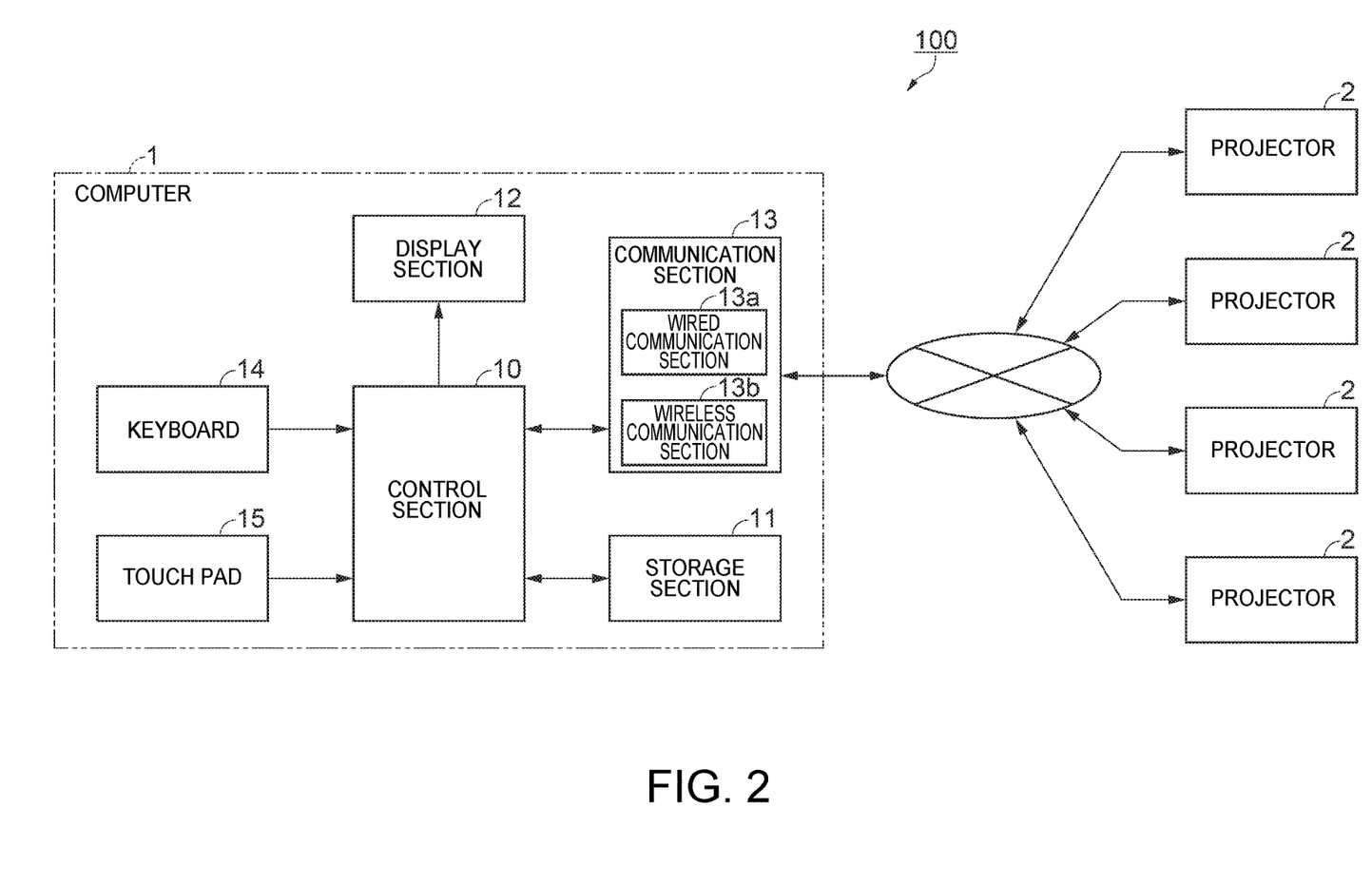
FIG. 2 is a block diagram showing a schematic configuration of a computer.

FIG. 2 is a block diagram showing a schematic configuration of the computer 1.

As shown in FIG. 2, the computer 1 is configured including a control section 10, a storage section 11, a display section 12, a communication section 13 (a first communication section), a keyboard 14 and a touch pad 15.

The control section 10 is configured including at least one processor, a RAM (random access memory), a ROM (read only memory) and so on. The control section 10 operates in accordance with a program stored in the ROM, or a program retrieved from the storage section 11 into the RAM to thereby integrally control the operation of the computer 1.

The storage section 11 is configured including a storage device such as a hard disk drive or a solid-state drive. The storage section 11 stores an operating system (OS) installed, application programs, a variety of data and so on. In the storage section 11 of the present embodiment, there is installed an application program (a projector control tool) for controlling the projector 2.

The display section 12 is configured including a display device such as a liquid crystal display or an organic electroluminescence (EL) display, and displays an image based on the control by the control section 10.

The communication section 13 performs communication with an external device (e.g., the projector 2) connected via a network based on the control by the control section 10. The communication section 13 of the present embodiment is provided with at least one of a wired communication section 13a for performing the communication via a wired network such as a wired LAN, and a wireless communication section 13b for performing the communication via a wireless network such as a wireless LAN. In other words, the communication section 13 is capable of performing the communication with the external device using at least one of the communication methods of the wired communication (a first communication method) and the wireless communication (a second communication method). In the present embodiment, the computer 1 is connected to at least one projector 2 via the communication section 13, and is capable of controlling the projector 2 thus connected.

The wired communication section 13a is a wired interface for performing the communication with the external device via the wired network such as the wired LAN. The wired communication section 13a is provided with a connector for wired connection, and an interface circuit (both not shown) corresponding to the connector, and is connected to the projector 2 via the wired network. The wireless communication section 13b is a wireless interface for performing the communication with the external device via the wireless network such as the wireless LAN. The wireless communication section 13b is provided with an antenna, an RF (radio frequency) circuit, and so on not shown, and performs the wireless communication with the projector 2 in accordance with the control by the control section 10.

The keyboard 14 is an input device for receiving an input of a character, a control code and so on in accordance with a key operation. The touch pad 15 is a pointing device for receiving input operations such as a moving operation, a click operation, and a drag operation of a pointer (not shown) for indicating a position on a display image. The keyboard 14 and the touch pad 15 each transmit an operation signal based on an operation made by the user to the control section 10. It should be noted that in the case in which a mouse, which is an external pointing device, is connected to the computer 1, it is also possible to use the mouse instead of the tough pad 15.

Figure 3:
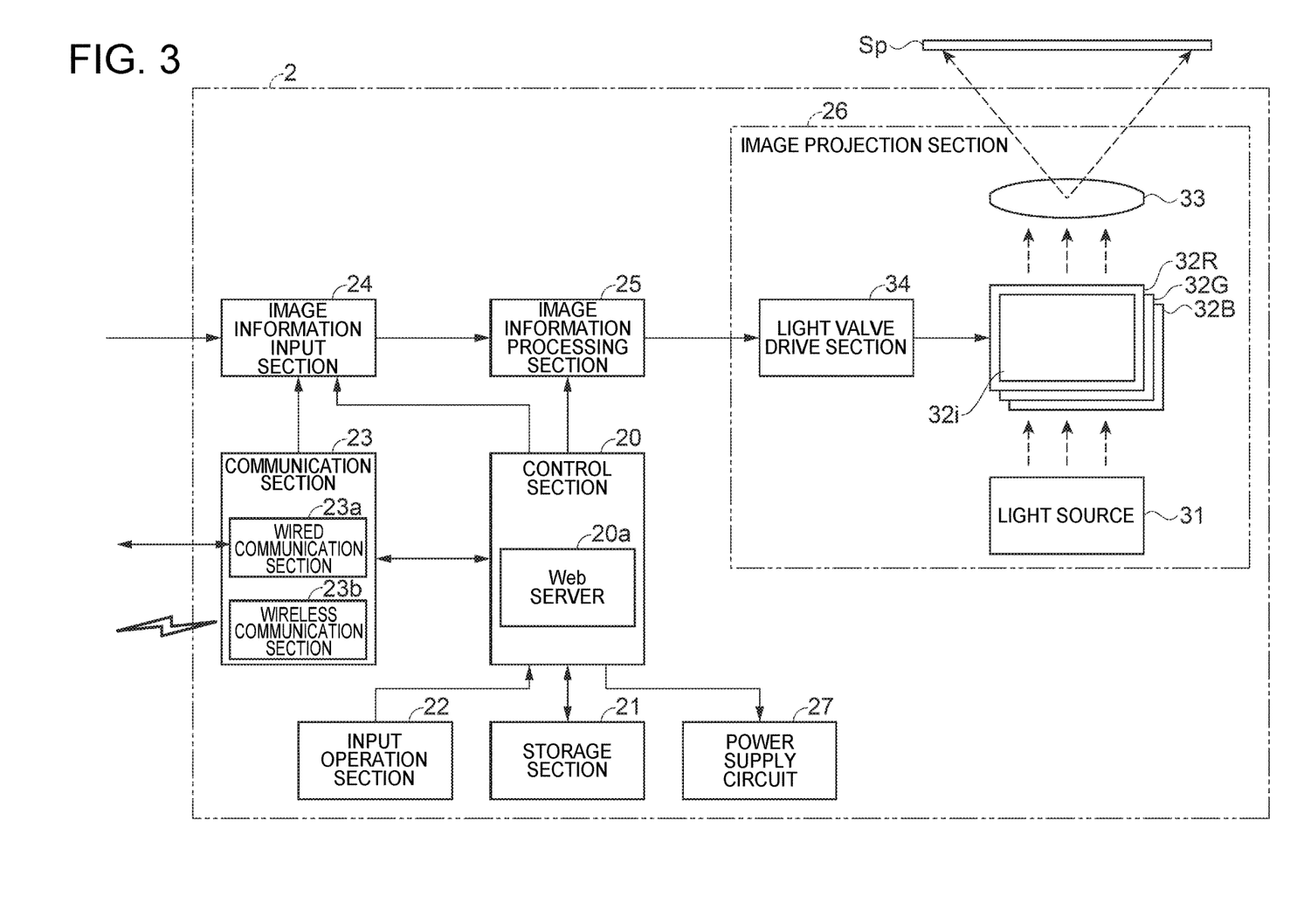
FIG. 3 is a block diagram showing a schematic configuration of a projector.

Then, a configuration of the projector 2 will be described.

FIG. 3 is a block diagram showing a schematic configuration of the projector 2.

As shown in FIG. 3, the projector 2 is configured including a control section 20, a storage section 21, an input operation section 22, a communication section 23 (a second communication section), an image information input section 24, an image information processing section 25, an image projection section 26 and a power supply circuit 27.

The control section 20 is configured including at least one processor, and operates in accordance with a control program stored in the storage section 21 to thereby integrally control the operation of the projector 2. Further, the control section 20 has a Web server 20a as a functional block realized by the control program. The operation of the Web server 20a will be described later.

The storage section 21 is configured including a RAM as a volatile memory, a ROM as a nonvolatile memory and so on. The RAM is used for temporary storage of a variety of types of data, and the ROM stores the control program, control data and so on for controlling the operation of the projector 2.

The input operation section 22 is provided with a plurality of operation keys for the user to provide a variety of instructions to the projector 2. As the operation keys provided to the input operation section 22, there are cited a "power key" for switching between ON and OFF (standby) of the power, a "menu key" for displaying a setting menu for performing a variety of types of settings, "directional keys" for selecting items in the setting menu, and so on. When the user operates a variety of operation keys of the input operation section 22, the input operation section 22 outputs an operation signal corresponding to the operation content by the user to the control section 20. It should be noted that it is also possible to adopt a configuration of using a remote controller (not shown) capable of a remote operation as the input operation section 22. In this case, the remote controller transmits an operation signal of an infrared ray corresponding to the operation content by the user, and then a remote control signal receiving section not shown receives the operation signal to transmit the operation signal to the control section 20.

The communication section 23 performs communication with an external device (e.g., the computer 1) connected via a network based on the control by the control section 20. The communication section 23 is configured including a plurality of communication devices different in communication method from each other, and is provided with a wired communication section 23a for performing the communication via a wired network such as a wired LAN, and a wireless communication section 23b for performing the communication via a wireless network such as a wireless LAN in the present embodiment. Further, the storage section 21 stores connection information such as an IP address, a subnet mask, and a gateway address set by the user or a DHCP (dynamic host configuration protocol) server for each of the wired communication section 23a and the wireless communication section 23b, and the connection information is used in the connection and the communication.

The wired communication section 23a is a wired interface for performing the communication with the external device via the wired network such as the wired LAN. The wired communication section 23a is provided with a connector for wired connection, and an interface circuit (both not shown) corresponding to the connector, and is connected to the computer 1 via the wired network. The wireless communication section 23b is a wireless interface for performing the communication with the external device via the wireless network such as the wireless LAN. The wireless communication section 23b is provided with an antenna, an RF (radio frequency) circuit, and so on not shown, and performs the wireless communication with the computer 1 in accordance with the control by the control section 20.

The image information input section 24 is connected to an external image supply device not shown to receive supply of the image information from the image supply device. It should be noted that it is also possible for the image information input section 24 to be arranged to receive the supply of the image information from the computer 1 via the communication section 23. In the case of receiving the supply of the image information from the computer 1 via the communication section 23, it is also possible for the communication section 23 to function as the image information input section 24. Further, it is also possible for the image information input section 24 to be arranged to receive the supply of the image information previously stored in the storage section 21 from the control section 20. The image information input section 24 outputs the image information thus input, namely the image information representing the input image, to the image information processing section 25.

Based on the control by the control section 20, the image information processing section 25 performs a variety of processes on the image information input from the image information input section 24, and then outputs the image information having been processed to a light valve drive section 34 of the image projection section 26. For example, the image information processing section 25 performs a process of adjusting the image quality such as brightness or contrast, a process of superimposing an OSD (on-screen display) image such as a menu image or a message image on the input image, and so on on the image information as needed.

It should be noted that the image information input section 24 and the image information processing section 25 can be constituted by one processor or a plurality of processors and so on, or can also be constituted by a dedicated processing device such as an ASIC (application specific integrated circuit) or an FPGA (field programmable gate array).

The image projection section 26 is configured including a light source 31, three liquid crystal light valves 32R, 32G, and 32B as light modulation devices, a projection optical system 33, a light valve drive section 34, and so on. The image projection section 26 modulates the light emitted from the light source 31 with the liquid crystal light valves 32R, 32G, and 32B to thereby form image light, and then projects the image light from the projection optical system 33 constituted by a projection lens and so on to thereby display the image on the projection surface Sp.

The light source 31 is configured including a discharge type light source lamp such as a super high-pressure mercury lamp or a metal halide lamp, or a solid-state light source such as a light emitting diode or a semiconductor laser. The light emitted from the light source 31 is converted into the light having a substantially uniform intensity distribution by an integrator optical system not shown, and is then separated into colored light components of red (R), green (G), and blue (B), the three primary colors of light, by a color separation optical system not shown, and then the colored light components enter the liquid crystal light valves 32R, 32G, and 32B, respectively.

The liquid crystal light valves 32R, 32G, and 32B are each formed of a transmissive liquid crystal panel having a liquid crystal material encapsulated between a pair of transparent substrates, and so on. The liquid crystal panels are each provided with a rectangular image forming area 32i constituted by a plurality of pixels arranged in a matrix, and are each arranged so that a drive voltage can be applied to the liquid crystal material pixel by pixel.

The light valve drive section 34 forms an image in the image forming area 32i of each of the liquid crystal light valves 32R, 32G and 32B. Specifically, the light valve drive section 34 applies the drive voltages corresponding to the image information input from the image information processing section 25 to the respective pixels in the image forming area 32i to thereby set the pixels to respective light transmittances corresponding to the image information. The light emitted from the light source device 31 is transmitted through the image forming area 32i of each of the liquid crystal light valves 32R, 32G and 32B to thereby be modulated pixel by pixel, and thus the image light corresponding to the image information is formed for each of the colored light beams. The image light beams of the respective colored light beams thus formed are combined pixel by pixel by a color composition optical system not shown to turn to the image light beam representing a color image, and are then projected on the projection surface Sp by the projection optical system 33 in an enlarged manner. As a result, on the projection surface Sp, there is displayed an image (the input image) based on the image information input to the image information input section 24.

The power supply circuit 27 is externally supplied with the commercial power (not shown) of 100 VAC or the like. The power supply circuit 27 converts the commercial power (alternating-current power) into direct-current power with a predetermined voltage to supply each section of the projector 2 with the electrical power (the supply path to each section will be omitted from the drawing). The control section 20 is capable of controlling the power supply circuit 27 to start and stop the power supply to each section.

Here, the projector 2 is arranged to be able to switch between an ON state in which the power necessary for the normal operation is supplied from the power supply circuit 27 to each section, and a standby state in which the power supply to each section is limited to make the power consumption extremely smaller compared to the ON state. It should be noted that it is arranged that some of the functions of the control section 20 and some of the functions of the communication section 23 are made operable even in the standby state so that the control section 20 can perform the control corresponding to the control command having been received by the communication section 23 even in the standby state.

Specifically, in the standby state, the communication section 23 is set to the state in which the power is supplied to only either one of the wired communication section 23a and the wireless communication section 23b, and the power supply to the other is stopped. In other words, in the standby state, one of the wired communication section 23a and the wireless communication section 23b is only set to the operable state as the enabled communication device while the other remains disabled. Further, in the standby state, in the case in which the control section 20 has received the instruction of starting up the projector via the communication section 23, it is also possible for the control section to control the power supply circuit 27 to start the power supply to each section to thereby make the transition of the state of the projector 2 to the ON state (to thereby make the projector 2 be restored from the standby state). As described above, the projector 2 is arranged to be able to make the transition to the ON state due to the control via the wired or wireless network in the standby state, and at the same time, to be able to reduce the power consumption in the standby state compared to the case of keeping both of the wired communication section 23a and the wireless communication section 23b enabled.

It should be noted that the storage section 21 stores information for setting the operation state of the communication state 23 in the standby state, namely information (communication section setting information) representing which one of the communication devices, namely the wired communication section 23a and the wireless communication section 23b, is enabled in the standby state, and the control section 20 enables the one of the communication devices while disabling the other of the communication devices according to the communication section setting information on transiting to the standby state.

Then, an operation of the image display system 100 will be described.

When the user operates the computer 1 to start up the projector control tool, the control section 10 of the computer 1 start the operation in accordance with the projector control tool. Firstly, the control section 10 searches for the projectors 2 which can be communicated with the communication section 13, and then establishes the connection with the projectors 2 thus found. Then, the control section 10 displays a display screen 50 (see FIG. 4) including a list of the projectors 2 the connection with which has been established on the display section 12.

Figure 4:
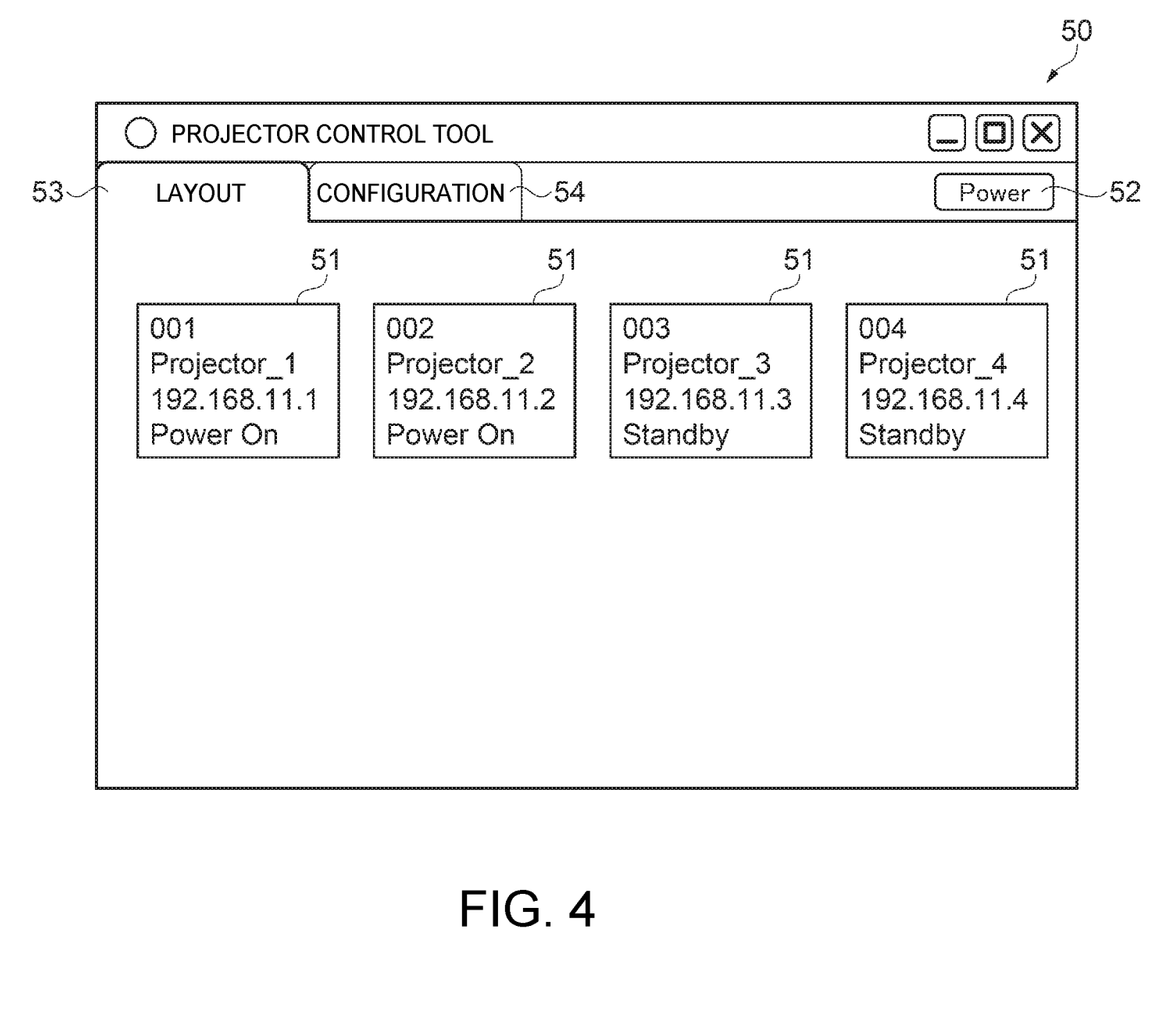
FIG. 4 is a diagram showing a display screen of a projector control tool.

FIG. 4 is a diagram showing the display screen 50 of the projector control tool.

As shown in FIG. 4, labels 51 each having a rectangular shape and corresponding respectively to the projectors 2 thus connected are disposed in the display screen 50, and in each of the labels 51, there are shown an identifier (a number) for identifying the projector 2, a name of the projector 2 having been set, an IP address, and a current power supply state (the ON state or the standby state) of the projector 2. Further, in the display screen 50, there is disposed a power supply control button 52 for switching the power supply state of the projector 2. By selecting the desired projector 2 (the label 51) and then performing a click operation on the power supply control button 52, it is possible for the user to make the projector 2 perform an operation (an ON operation) for making the transition from the standby state to the ON state, and an operation (an OFF operation) for making the transition from the ON state to the standby state.

The display screen 50 includes a layout tab 53 for adjusting the layout of the labels 51, and a configuration tab 54 for performing setting and adjustment of the projector 2, and it is possible for the user to switch the display content by selecting these tabs. In the case of arranging images projected from the respective projectors 2 to display a single large image, it is possible for the user to align the layout of the labels 51 with the actual image layout by selecting the layout tab 53 and then moving the labels 51 with drag operations. Thus, it becomes possible to intuitively designate the projector 2 (the label 51) which should be selected when selecting the projector 2 as a control target. In contrast, in the case of selecting the configuration tab 54, it is possible for the user to change a variety of setting values of each of the projectors 2 and to perform initialization for restoring the setting values to the initial state, and at the same time, to adjust the quality and the shape of the image to be projected by the projector 2, and to adjust the state (e.g., focus and zoom) of the projection optical system 33 in accordance with the setting screen (not shown) newly displayed.

In the present embodiment, it is realized by the control section 10 of the computer 1 accessing the Web server 20a of the projector 2 in compliance with the HTTP (hypertext transfer protocol) to change the setting values of the projector 2 and to perform a variety of adjustments using the projector control tool as described above. Based on the information (a control command) which is notified of from the computer 1 to the Web server 20a, the control section 20 of the projector 2 makes the storage section 21 store the setting values thus set, and makes each section of the projector 2 perform the adjustment thus instructed.

Here, in the present embodiment, in the case in which the connection with the projector 2 has been established using the projector control tool, and in the case in which the OFF operation or the initialization of the setting values has been instructed using the projector control tool, the control section 10 transmits the corresponding control command to the projector 2, and at the same time, transmits the control command (hereinafter referred to as a "communication section setting command") for setting the communication device which is enabled in the standby state to the projector 2.

Figure 5:
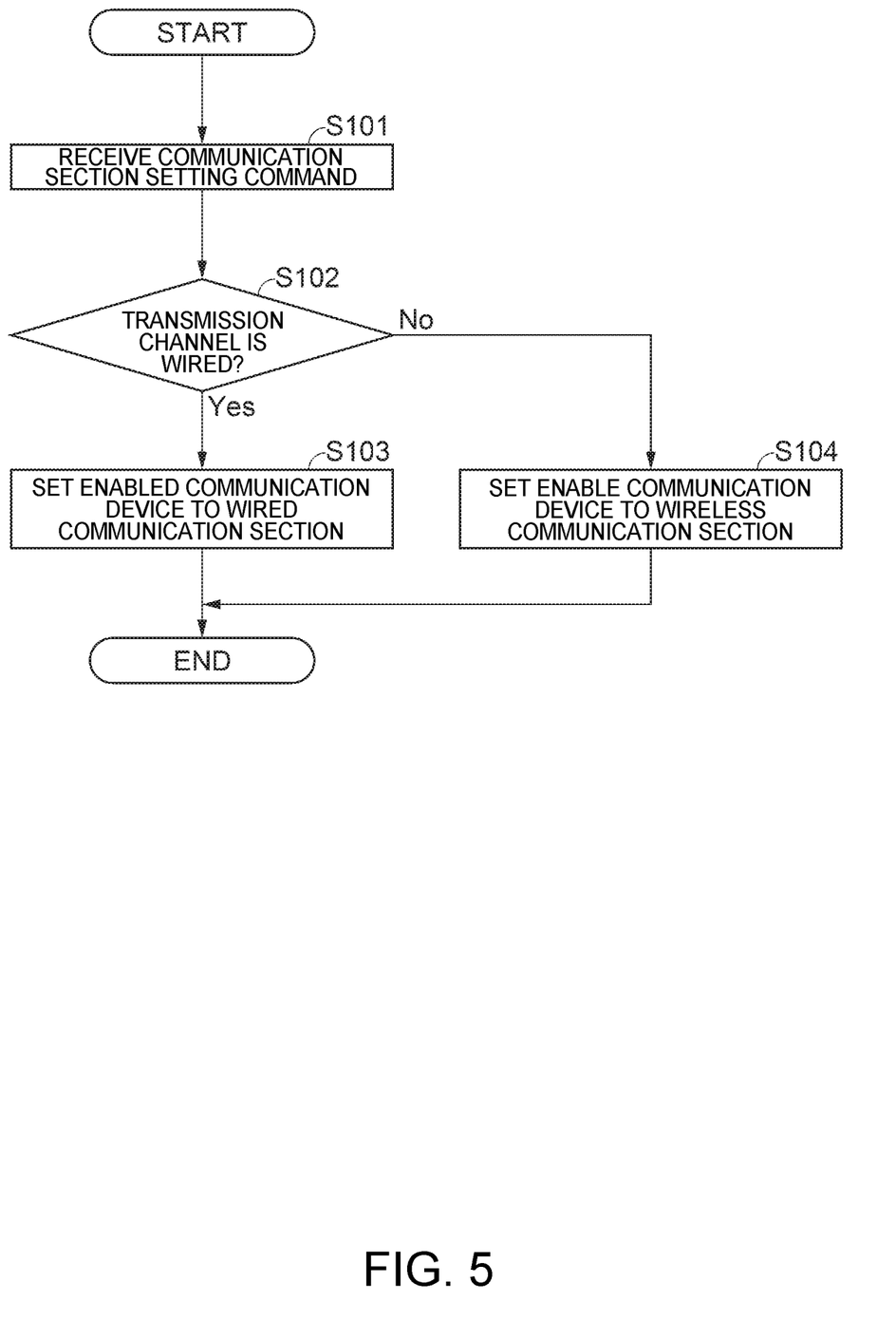
FIG. 5 is a flowchart showing an operation of the projector when setting a communication device enabled in a standby state.

FIG. 5 is a flowchart showing an operation (a control method) of the projector 2 when setting the communication device enabled in the standby state.

As shown in FIG. 5, in the step S101, the control section 20 of the projector 2 receives the communication section setting command transmitted from the computer 1 via the communication section 23.

Then, in the step S102, the control section 20 determines whether the channel through which the communication section setting command has been transmitted (received) is the wired network or the wireless network. In other words, the control section 20 determines which communication method out of the wired communication and the wireless communication has been used for transmitting the communication section setting command. For example, the control command transmitted from the computer 1 is transmitted to the projector 2 by packet, and the header attached to the packet includes the IP address of the destination of the control command. Therefore, it is possible for the control section 20 to determine whether the transmission channel is wired one or wireless one by obtaining the IP address designated as the destination of the communication section setting command from the Web server 20a having received the communication section setting command, and then comparing the IP address thus obtained with each the IP addresses of the respective communication devices stored in the storage section 21. Specifically, the control section 20 determines that the communication section setting command has been received by the communication device having the same IP address as the IP address thus obtained. Then, the control section 20 makes the transition of the process to the step S103 in the case in which the transmission channel of the communication section setting command is the wired network, or makes the transition of the process to the step S104 in the case of the wireless network.

In the case in which it has been determined that the communication section setting command has been transmitted via the wired network, and then the transition of the process to the step S103 has been made, the control section 20 updates the communication section setting information so that the communication device enabled in the standby state becomes the wired communication section 23a, and then terminates the process. In other words, the control section 20 sets the communication method enabled in the standby state to the wired communication.

In contrast, in the case in which it has been determined that the communication section setting command has been transmitted via the wireless network, and then the transition of the process to the step S104 has been made, the control section 20 updates the communication section setting information so that the communication device enabled in the standby state becomes the wireless communication section 23b, and then terminates the process. In other words, the control section 20 sets the communication method enabled in the standby state to the wireless communication.

It should be noted that the projector 2 is arranged not to be able to receive other instructions than the ON operation in the standby state. Therefore, in the standby state, the control section 20 cannot perform the update of the communication section setting information. Therefore, in the case in which the OFF operation is instructed by the computer 1 to the projector 2 in the ON state, the control section 20 updates the communication section setting information before making the transition of the projector 2 to the standby state. Further, in the case in which the projector 2 is in the standby state when being connected to the computer 1, the update of the communication section setting information is not performed although the communication section setting command is transmitted from the computer 1. Further, in the case in which the instruction for initializing the setting values has been issued by the computer 1, the control section 20 updates the communication section setting information after performing the initialization.

In the case in which the projector 2 in the ON state makes the transition to the standby state, the control section 20 instructs the power supply circuit 27 to keep the power supply to one communication device based on the communication section setting information out of the wired communication section 23a and the wireless communication section 23b, and to restrict (stop) the power supply to the other communication device. Specifically, in the case in which it is set in the communication section setting information that the wired communication section 23a is enabled in the standby state, the control section 20 sets the operation state of the communication section 23 to the state (a first operation state) in which the communication by the wired communication section 23a is enabled while the communication by the wireless communication section 23b is disabled when making the transition to the standby state. In contrast, in the case in which it is set in the communication section setting information that the wireless communication section 23b is enabled in the standby state, the control section 20 sets the operation state of the communication section 23 to the state (a second operation state) in which the communication by the wireless communication section 23b is enabled while the communication by the wired communication section 23a is disabled when making the transition to the standby state.

It should be noted that the power consumed by the wired communication section 23a becomes obviously smaller in the second operation state in which the wired communication section 23a is disabled than in the first operation state in which the wired communication section 23a is enabled. Similarly, the power consumed by the wireless communication section 23b becomes smaller in the first operation state in which the wireless communication section 23b is disabled than in the second operation state in which the wireless communication section 23b is enabled.

Since the image display system 100 according to the present embodiment operates in such a manner as described above, when the control of the projector 2 is performed from the computer 1 using the projector control tool, and the communication section setting command is transmitted due to the control, the communication section setting information is updated in the projector 2 so that the communication device having performed the communication with the computer 1, namely the communication device capable of performing the communication with the computer 1, is enabled in the standby state. Therefore, it becomes possible to make the projector 2 perform the ON operation using the projector control tool from the same computer 1 after the projector 2 has made the transition to the standby state. In particular, in the present embodiment, since the communication section setting command is transmitted when performing the instruction of the OFF operation, it is possible to prevent that it becomes unachievable to make the projector 2 perform the ON operation from the same computer 1 after making the projector 2 perform the OFF operation using the projector control tool. Further, since the communication section setting command is also transmitted when instructing the initialization of the setting values, even if the communication section setting information is restored to the initial setting value due to the initialization, the communication section setting information is subsequently updated to an appropriate setting value (the communication device capable of communicating with the computer 1), and thus, it is possible to prevent that it becomes unachievable to make the projector 2 perform the ON operation from the same computer 1.

As described hereinabove, according to the projector 2, the image display system 100 and the method of controlling the projector 2 of the present embodiment, the following advantages can be obtained.

(1) According to the present embodiment, when the projector 2 receives the communication section setting command from the computer 1, the projector 2 determines which communication method out of the wired communication and the wireless communication is used in the communication with the computer 1 having transmitted the command, and then sets the communication method enabled in the standby state to the one communication method based on the determination result. Therefore, the power consumption in the standby state is reduced compared to the case of keeping the both communication methods enabled, and at the same time, it is possible to prevent the communication between the computer 1 and the projector 2 from becoming unachievable in the standby state.

(2) According to the present embodiment, since the computer 1 transmits the communication section setting command in the case in which the connection with the projector 2 has been established, it becomes possible to keep the communication with the computer 1 thus connected also in the standby state.

(3) According to the present embodiment, since the computer 1 transmits the communication section setting command in the case of making the instruction of initializing the setting values of the projector 2, even if the communication method enabled in the standby state is restored to the initial setting value due to the initialization of the setting values, it becomes possible to update the communication section setting information to the communication method with which the communication with the computer 1 can be achieved.

(4) According to the present embodiment, since the computer 1 transmits the communication section setting command in the case of making the instruction of making the projector 2 make the transition to the standby state, it is possible to prevent that it becomes unachievable for the same computer 1 to make the instruction of being restored from the standby state after making the projector 2 make the transition to the standby state.

(5) According to the present embodiment, since the projector 2 determines the communication method based on the IP address designated by the computer 1 as the destination of the communication section setting command, it becomes possible to easily determine the communication method using the comparison with the IP addresses stored in the projector 2.

It should be noted that in the embodiment described above, in the step S102 (see FIG. 5), the control section 20 determines whether the channel through which the communication section setting command has been transmitted is the wired network or the wireless network, and corresponds to a determination section. Further, the IP address set to the wired communication section 23a corresponds to a first IP address, and the IP address set to the wireless communication section 23b corresponds to a second IP address.

Modified Examples

Further, the embodiment described above can also be modified as follows.

Although in the embodiment described above, the projector control tool transmits the control command in compliance with the HTTP to the Web server 20a of the projector 2, the communication configuration of the projector control tool is not limited thereto, and other communication configurations can also be adopted.

Although in the embodiment described above, the channel through which the communication section setting command has been transmitted is determined based on the IP address of the destination obtained from the Web server 20a, the method of determining the transmission channel is not limited thereto. For example, it is also possible for the control section 20 to detect (obtain) an IP address of a source (the computer 1) of the command, and then compare a subnet (a network address) of the IP address and a subnet of the IP address of each of the communication devices stored in the storage section 21 with each other to determine that the command has been received by the communication device belonging to the same subnet. Further, it is also possible to arrange that the control section 20 monitors the communication situations of the wired communication section 23a and the wireless communication section 23b to determine which communication device is used for receiving the communication section setting command.

Although in the embodiment described above, the computer 1 is arranged to transmit the communication section setting command when establishing the connection with the projector 2 and when instructing the OFF operation or the initialization operation, the timing for transmitting the communication section setting command is not limited to the above, and it is also possible to arrange that the communication section setting command is transmitted when, for example, performing the ON operation.

Although in the embodiment described above, there is described the configuration in which the communication section 23 of the projector 2 is provided with the wired communication section 23*a* for performing the communication with wire, and the wireless communication section 23*b* for wirelessly performing the communication, the communication method of the communication section 23 is not limited to the combination described above. For example, it is also possible to adopt a configuration in which the communication section 23 is provided with a first wireless communication section for performing the communication compliant with the wireless LAN and a second wireless communication section for performing the communication compliant with Bluetooth (registered trademark) as the communication devices, and enables either one of the communication devices in the standby state. Further, it is also possible to adopt a configuration in which three or more communication devices different in communication method from each other are provided, and either one of or a plurality of communication devices is enabled in the standby state.

Although in the embodiment described above, the projector 2 is provided with the configuration in which only the instruction of the ON operation can be received in the standby state, it is also possible to adopt a configuration in which other instructions than the instruction of the ON operation can be received.

Although in the embodiment described above, the transmissive liquid crystal light valves 32R, 32G and 32B are used as the light modulation devices, it is also possible to use reflective light modulation devices such as reflective liquid crystal light valves. Further, it is also possible to use a digital mirror device or the like for modulating the light emitted from the light source 31 by controlling the emission direction of the incident light for every micromirror as a pixel. Further, the configuration of providing the plurality of light modulation devices for the respective colored light beams is not a limitation, but it is also possible to adopt a configuration of modulating the plurality of colored light beams with a single light modulation device in a time-sharing manner.

Although in the embodiment described above, the projectors 2 are adopted as the image display devices, the image display device is not limited to the projector 2, and it is also possible to adopt other image display devices such as a liquid crystal display or an organic EL display.

Although in the embodiment described above, the computer 1 of the notebook type is adopted as the control device, the control device is not limited to the computer 1 of the notebook type, and it is also possible to adopt other control devices such as a computer of a desktop type, a smartphone or a tablet terminal.

What is claimed is:

1. A method of controlling an image display device, comprising:
    establishing connection with one of a first communication method and a second communication method between a control device adapted to control the image display device and the image display device;
    transmitting a predetermined command from the control device to the image display device after the connection is established;
    determining whether the image display device communicates with the control device using the first communication method or the second communication method in a case of receiving the predetermined command;
    updating setting information so that the image display device is set to a first operation state in which communication using the first communication method is enabled in a standby state and communication using the second communication method is disabled in the standby state, in a case in which it is determined that the image display device communicates with the control device using the first communication method; and
    updating the setting information so that the image display device is set to a second operation state in which the communication using the second communication method is enabled in the standby state and the communication using the first communication method is disabled in the standby state, in a case in which it is determined that the image display device communicates with the control device using the second communication method.

2. The method of controlling an image display device according to claim 1, wherein
    the control device transmits the predetermined command in a case in which the connection with the image display device is established.

3. The method of controlling an image display device according to claim 1, wherein
    the control device transmits the predetermined command in a case of making an instruction of initializing a setting value of the image display device.

4. The method of controlling an image display device according to claim 1, wherein
    the control device transmits the predetermined command in a case of making an instruction of making the image display device make a transition to the standby state.

5. The method of controlling an image display device according to claim 1, wherein
    a first IP address used in a case of performing the communication using the first communication method and a second IP address used in a case of performing the communication using the second communication method are set to the image display device, and
    the image display device obtains an IP address designated by the control device as a destination of the predetermined command, and then compares the IP address obtained with the first IP address and the second IP address to determine the communication method.

6. The method of controlling an image display device according to claim 1, wherein
    a first IP address used in a case of performing the communication using the first communication method and a second IP address used in a case of performing the communication using the second communication method are set to the image display device, and
    the image display device obtains an IP address of the control device, and then compares a subnet of the IP address obtained with subnets of the first IP address and the second IP address to determine the communication method.

7. The method of controlling an image display device according to claim 1, wherein
    the first communication method is a communication method adapted to perform the communication with wire, and the second communication method is a communication method adapted to perform the communication wirelessly.

8. The method of controlling an image display device according to claim 1, wherein
the first communication method and the second communication method are each a communication method adapted to perform the communication wirelessly.

9. The method of controlling an image display device according to claim 1, wherein the first communication method and the second communication method are methods for delivering image data from the control device to the image display device for the image display device to display the image data.

10. An image display system comprising:
an image display device adapted to display an image; and
a control device adapted to control the image display device,
wherein the control device includes a first communication section adapted to establish connection using one of a first communication method and a second communication method with the image display device, and transmit a predetermined command to the image display device after the connection is established,
the image display device includes
a second communication section capable of performing communication with the control device using the first communication method and the second communication method,
a determination section adapted to determine whether the second communication section communicates with the control device using the first communication method or the second communication method, in a case in which the second communication section receives the predetermined command from the control device, and
a control section adapted to update setting information used to set an operation state of the second communication section in a standby state based on a determination result of the determination section, and
the control section
updates the setting information so that the second communication section is set to a first operation state in which communication using the first communication method is enabled in the standby state and communication using the second communication method is disabled in the standby state, in a case in which the determination section determines that the communication with the control device is performed using the first communication method, and
updates the setting information so that the second communication section is set to a second operation state in which the communication using the second communication method is enabled in the standby state and the communication using the first communication method is disabled in the standby state, in a case in which the determination section determines that the communication with the control device is performed using the second communication method.

11. The image display system according to claim 10, wherein the first communication method and the second communication method are methods for delivering image data from the control device to the image display device for the image display device to display the image data.

12. An image display device adapted to display an image, comprising:
a communication section capable of performing communication with an external control device using a first communication method and a second communication method;
a determination section adapted to determine whether the communication section communicates with the control device using the first communication method or the second communication method; and
a control section adapted to update setting information based on a determination result of the determination section, the setting information is information to set an operation state of the communication section in a standby state,
wherein
when the determination section determines that the communication section communicates with the control device using the first communication method, the control section updates the setting information to a first operation state in which the first communication method is enabled in the standby state and the second communication method is disabled in the standby state, and
when the determination section determines that the communication section communicates with the control device using the second communication method, the control section updates the setting information to a second operation state in which the second communication method is enabled in the standby state and the first communication method is disabled in the standby state.

13. The image display device according to claim 12, wherein the first communication method and the second communication method are methods for delivering image data from the control device to the image display device for the image display device to display the image data.

* * * * *